United States Patent
Lewis et al.

(10) Patent No.: US 11,368,742 B2
(45) Date of Patent: *Jun. 21, 2022

(54) PERSISTENT MEDIA PLAYER

(71) Applicant: Google LLC, Mountain View, CA (US)

(72) Inventors: Justin Lewis, Marina del Rey, CA (US); Gavin James, Los Angeles, CA (US)

(73) Assignee: GOOGLE LLC, Mountain View, CA (US)

(*) Notice: Subject to any disclaimer, the term of this patent is extended or adjusted under 35 U.S.C. 154(b) by 21 days.

This patent is subject to a terminal disclaimer.

(21) Appl. No.: 16/882,409

(22) Filed: May 22, 2020

(65) Prior Publication Data

US 2020/0288194 A1 Sep. 10, 2020

Related U.S. Application Data

(63) Continuation of application No. 16/036,896, filed on Jul. 16, 2018, now Pat. No. 10,667,002, which is a
(Continued)

(51) Int. Cl.
*G06F 3/048* (2013.01)
*H04N 21/431* (2011.01)
(Continued)

(52) U.S. Cl.
CPC ... *H04N 21/4314* (2013.01); *H04N 21/26258* (2013.01); *H04N 21/4825* (2013.01); *G06F 3/048* (2013.01); *G06F 3/0485* (2013.01)

(58) Field of Classification Search
None
See application file for complete search history.

(56) References Cited

U.S. PATENT DOCUMENTS 9,342,490 B1 * 5/2016 Taylor ............... G06F 16/95
2007/0136685 A1 6/2007 Bhatia
(Continued)

FOREIGN PATENT DOCUMENTS

CN 102347045 A 2/2012
CN 103077673 A 5/2013
(Continued)

OTHER PUBLICATIONS

International Searching Authority, "Notification of Transmittal of the International Search Report and the Written Opinion of the International Search Authority, or the Declaration," for International Application No. PCT/US2015/011649, dated Apr. 10, 2015, 11 pages.
(Continued)

*Primary Examiner* — Xuyang Xia
(74) *Attorney, Agent, or Firm* — Lowenstein Sandler LLP (57) ABSTRACT

A persistent media player is disclosed. A method for providing the persistent media player includes displaying, by an electronic device, a first portion of a scrollable document in a user interface (UI) of an application executed on the electronic device. The first portion includes a media player that is to present a first media item. The method further includes receiving an input to scroll to a second portion of the scrollable document. The method also includes displaying the second portion of the scrollable document, where the first portion is no longer visible and where the media player continues to be visible.

20 Claims, 6 Drawing Sheets

Related U.S. Application Data continuation of application No. 14/172,746, filed on Feb. 4, 2014, now Pat. No. 10,028,008.

(51) Int. Cl.
*H04N 21/262* (2011.01)
*H04N 21/482* (2011.01)
*G06F 3/0485* (2022.01)

(56) References Cited

U.S. PATENT DOCUMENTS

| | | |
|---|---|---|
| 2007/0277105 A1 | 11/2007 | Lee et al. |
| 2008/0072132 A1 | 3/2008 | Moraveji et al. |
| 2009/0049385 A1* | 2/2009 | Blinnikka ............. G06F 3/0481 715/719 |
| 2009/0125544 A1 | 5/2009 | Brindley |
| 2010/0306648 A1 | 12/2010 | Wilairat |
| 2011/0087992 A1 | 4/2011 | Wang et al. |
| 2012/0278725 A1* | 11/2012 | Gordon ............ H04N 21/25891 715/738 |
| 2013/0080968 A1 | 3/2013 | Hanson et al. |
| 2013/0145267 A1* | 6/2013 | Ramachandran ... G06F 3/04883 715/719 |
| 2013/0227414 A1* | 8/2013 | Hwang ..................... G06T 1/20 715/719 |
| 2013/0235088 A1 | 9/2013 | Miura |
| 2013/0265266 A1 | 10/2013 | Brinda et al. |
| 2014/0215542 A1* | 7/2014 | Terpe ................. H04N 21/4126 725/112 |
| 2014/0298220 A1* | 10/2014 | Luu ..................... G06F 3/04817 715/765 |
| 2015/0025661 A1* | 1/2015 | Vega-Zayas ..... H04N 21/26258 700/94 |

FOREIGN PATENT DOCUMENTS

| | | |
|---|---|---|
| EP | 2369460 A2 | 9/2011 |
| EP | 2 631 773 A2 | 8/2013 |
| KR | 1020130097372 | 9/2013 |

OTHER PUBLICATIONS

Extended European Search Report for EP Patent Application No. 15745860.5, dated Sep. 6, 2017, 10 pages.
Notice of Preliminary Rejection for KR Patent Application No. 10-2016-7024196, dated Sep. 14, 2017, pp. 7.
European Search Report for Application No. EP 15745860.5, dated Jun. 6, 2017, 13 pages.
Ahmed Waqas, "Video Pinner for Chrome: Keep You Tube Videos in view as you Scroll Down the Comments", dated Nov. 13, 2013, http://www.addictivetips.com/web/keep-youtube-videos-in-view-as-you-scroll-down-comments-chrome/, retrieved on May 18, 2017, 1 page.
China Patent Application No. 201910211749.3, Office Action dated Sep. 1, 2020, 12 pgs.

\* cited by examiner

PERSISTENT MEDIA PLAYER

RELATED APPLICATIONS

This application is a continuation application of co-pending U.S. patent application Ser. No. 16/036,896, filed Jul. 16, 2018, which is a continuation U.S. patent application Ser. No. 14/172,746, filed Feb. 4, 2014, now U.S. Pat. No. 10,028,008, which is herein incorporated by reference.

TECHNICAL FIELD

Implementations of the present disclosure relate to content delivery, and more specifically, to a persistent media player.

BACKGROUND

The Internet allows people to obtain information, connect with others and share information with each other. Common Internet destinations include news websites, content sharing platforms, social networking platforms, and the like. Many websites and platforms include a content sharing aspect that allows users to upload, view, and share media items, such as video content, image content, audio content, and so on. Other users may comment on the shared content, discover new content, locate updates, share additional content, and otherwise interact with the provided content. The shared media items may include content from professional content creators, e.g., creators of movies, music, and articles, as well as media items from amateur content creators, e.g., creators of video and photo blogging, short original videos, and status updates.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for providing a persistent media player is disclosed. The method includes displaying, by an electronic device, a first portion of a scrollable document in a user interface (UI) of an application executed on the electronic device. The first portion comprises a media player that can present a first media item. The method further includes receiving an input to scroll to a second portion of the scrollable document. The method also includes displaying the second portion of the scrollable document, where the first portion is no longer visible and where the media player continues to be visible.

In one implementation, the scrollable document includes at least one of a list of a plurality of media items, a social feed, an array of elements, or a set of columnar elements. In an implementation, the method also includes receiving, via the interface, an input to activate the first media item. In addition, the media player can present the first media item for a period of time. In one implementation, the method can also include presenting a call-to-action (e.g., a prompt to request user input) after the period of time. The method can additionally include displaying a thumbnail of a second media item in the second portion of the scrollable document.

In some implementations, the media player is to present the second media item after the first media item is presented for the period of time. In implementations, the method includes adding the second media item to a playback queue upon displaying the thumbnail of the second media item. The method can further include displaying a first set of metadata associated with the media item.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Described herein is a mechanism for providing a persistent media player. Conventional options for media players (e.g., a video player presented within a browser or an application on a mobile device) provided by content sharing platforms are limited and static. For example, conventional media players generally do not continue content playback after the user navigates away from them. Instead, playback of the media player is stopped when the user navigates away from the media player. To watch the media item again, the user returns to the portion of the scrollable document that includes the media item to restart the media player. This can be disruptive and can negatively affect the viewing user experience. The media items can also be advertisements for monetizing online content. When an advertisement appears in a scrollable document, users can scroll past it, either deliberately or accidentally, without watching the entire video advertisement. Because the user did not view the entire advertisement, in some instances, that view would not be monetizable (e.g., the view would not be considered in compensation calculations).

Implementations of the present disclosure address the above deficiencies of conventional systems by providing a persistent media player that enables presentation of a media item after the user scrolls past that media item's location in a scrollable document (e.g., a document containing a stream of content such as a news feed, activity feed, etc.). The persistent media player enables users to continue to scroll to other portions of the scrollable document while a media item continues to play. The persistent media player playing a media item may be persistently visible while a user interacts with an application of a content sharing platform or a social network (the user can view or listen to the media item and interact with the above application at the same time). The persistent media player provides a "watch-while" experience. The "watch-while" experience allows the media item to stay visible even if the user scrolls to another portion of a scrollable document that did not originally include the media item. For example, the user can view a news feed in a content sharing application that includes feed items A-G, where feed item D includes a video item. The user can scroll down through the news feed to view feed items F-L below feed item D such that feed item D is no longer visible, but the video item remains present on the screen in the persistent media player. While the media item is being presented in the persistent media player, the user may then continue interacting with the content sharing application to, for example, decide what to watch next, search for another media item, and/or browse media items of the content sharing platform, continue social networking, without interrupting playback of the media item. Further, advertisements can be presented in the persistent media player, thereby enhancing monetization of online content.

Figure 1:
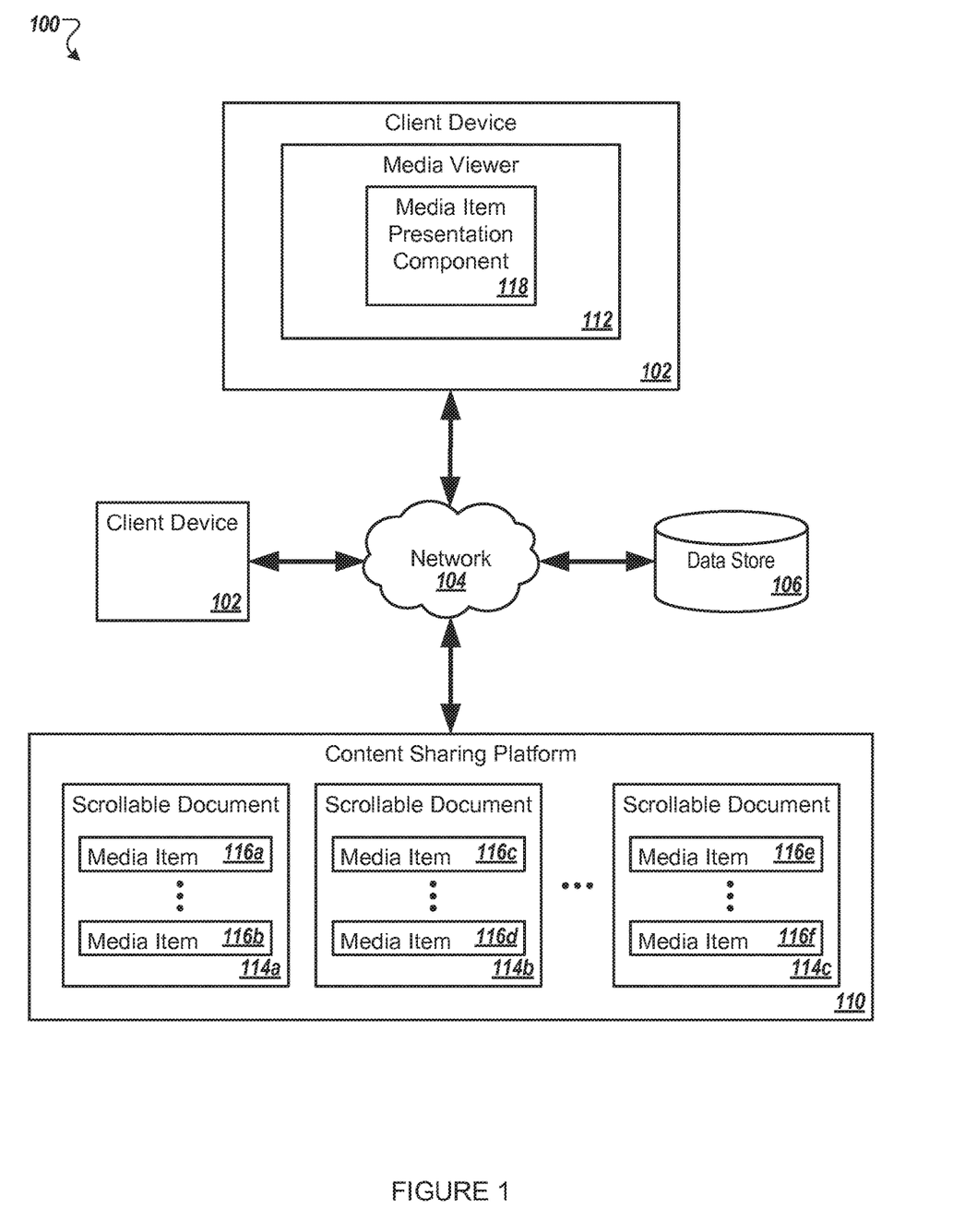
FIG. 1 illustrates an example system architecture, in accordance with one implementation of the disclosure.

FIG. 1 illustrates an example system architecture 100, in accordance with one implementation of the disclosure, for presenting a persistent media player. The system architecture 100 includes any number of client devices 102, a network 104, a data store 106, and a content sharing platform 110. In one implementation, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 102 may each include computing devices such as personal computers (PCs), laptops, mobile phones, smart phones, tablet computers, netbook computers etc. In some implementations, client device 102 may also be referred to as "user devices." Each client device includes a media viewer 112. In one implementation, the media viewer 112 may be an application that allows users to view content, such as images, videos, web pages, documents, etc. For example, the media viewer 112 may be a web browser that can access, retrieve, present, and/or navigate content (e.g., web pages such as Hyper Text Markup Language (HTML) pages, digital media items, etc.) served by a web server. The media viewer 112 may render, display, and/or present the content (e.g., a web page, a media viewer) to a user. The media viewer 112 may also display an embedded media player (e.g., a Flash® player or an HTML5 player) that is embedded in a web page (e.g., a web page that may provide information about a product sold by an online merchant). In another example, the media viewer 112 may be a standalone application that allows users to view digital media items (e.g., digital videos, digital images, electronic books, etc.).

The media viewer 112 may be provided to the client devices 102 by a server (not shown) and/or content sharing platform 110. For example, the media viewer 112 may be embedded media players that are embedded in web pages provided by the content sharing platform 110. In another example, the media viewer 112 may be an application that is downloaded from the server.

In general, functions described in one implementation as being performed by the content sharing platform 110 can also be performed on the client devices 102 in other implementations if appropriate. In addition, the functionality attributed to a particular component can be performed by different or multiple components operating together. The content sharing platform 110 can also be accessed as a service provided to other systems or devices through appropriate application programming interfaces, and thus is not limited to use in websites.

In one implementation, the content sharing platform 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 110 may allow a user to consume, upload, search for, approve of ("like"), dislike, and/or comment on media items. The content sharing platform 110 may also include a website (e.g., a webpage) that may be used to provide a user with access to the media items. Content sharing platform 110 may include any type of content delivery network providing access to content and/or media items and can include a social network, a news outlet, a media aggregator, and the like.

The content sharing platform 110 may provide one or more scrollable documents 114a-c. The scrollable document can be any type of navigable electronic document, where some of the document is currently visible in a user interface while another portion of the document is not currently visible in the user interface but will become visible upon activation of a scrolling mechanism (e.g., via a scrollbar, a scroll wheel, a touchscreen movement, automatic scrolling, etc.). The document can be scrollable vertically, horizontally scrollable, or a combination thereof. Examples of scrollable documents include a web page or a mobile app user interface document presenting a stream of content (frequently updated content) such as a news feed, an activity feed a social feed or a blog; a web page or a mobile app user interface document presenting predefined content such as a home page or a news page, etc. A user can navigate (e.g., via a gesture, scroll, click, swipe, etc.) to the portion that is not currently presented in the user interface.

Each scrollable document may include one or more media items 116. Examples of a media item 116 can include, and are not limited to, digital video, digital movies, digital photos, photo albums, digital music, website content, social media updates, video-on-demand, live-streamed media, electronic books (ebooks), electronic magazines, digital newspapers, digital audio books, electronic journals, web log (blog) entries, real simple syndication (RSS) feeds, electronic comic books, software applications, advertisements, etc. In some implementations, media item 116 is also referred to as a content item.

A media item 116 may be consumed via the web browser and/or via a mobile device application. For brevity and simplicity, an online video (also hereinafter referred to as a video) is used as an example of a media item 116 throughout this document. As used herein, "media," "media item," "online media item," "digital media," "digital media item,"

"content," and "content item" can include an electronic file that can be accessed or loaded using software, firmware or hardware configured to present the digital media item to an entity. In one implementation, the content sharing platform 110 may store the media item 116 using the data store 106.

In implementations, the media viewer 112 at the client device 102 includes a client-side media item presentation component 118 that presents the persistent media player. In one implementation, a server (not shown) may be included in the content sharing platform 110. The server may include a server-side media item presentation component. The media item presentation components on the client and the server may operate together to provide a persistent media player viewable at the client device 102. In other implementations, one or the other of the media item presentation components at the server or client may individually be responsible for providing the persistent media player viewable at the client device 102.

More specifically, in implementations of the disclosure, the media item presentation component 118 may generate the persistent media player at the media viewer 112 to provide playback of a media item 116 of the content sharing platform 110. Specifically, the persistent media player playing a media item 116 may be persistently visible to the user, even while the user simultaneously performs other tasks and activities, such as interacting with the content sharing platform 110 via the media viewer 112.

As a result, the persistent media player can provide a "watch-while" experience. The "watch-while" experience allows the user of the content sharing platform 110 at client device 102 to continue to watch a media item, even after scrolling away from the media item's position on a scrollable document without interrupting the playback of the media item in the media viewer 112. While the persistent media player is playing a media item, the user can browse and interact with other interfaces, functions and menus related to the content sharing platform 110 that are provided by the media viewer 112, but separate from viewing the media item in the persistent media player. For example, the other interfaces, functions and menus may include social networking elements, a suggestions interface of what to watch next, a search interface for media items of the content sharing platform, a browsing interface for media items of the content sharing platform, a settings interface, a subscriptions interface, a playlists interface, a favorites interface, a history interface, an uploads interface, and so on. The user may interact with these interfaces, functions, and menus as they normally would without interrupting playback of the media item.

In implementations, the persistent media player is configurable. For example, the content sharing platform 110 can present configuration options to a user, such as via a graphical user interface (GUI). The configuration options can include settings to limit, prioritize, or prevent the display of media items based on type (e.g., advertisements), content (e.g., explicit material) or their association with a particular source or user. For example, a user can configure the persistent media player to display media items from some social contacts and not from other social contact. In another example, a user can set a high priority on media items that are related to baseball, such that when two media items are to be played, any baseball media items are played first.

In implementations, a channel is presented via a scrollable document 114. A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Each channel may be presented via a scrollable document. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel and presented to a user via a scrollable document. Users, other than the owner of the channel, can subscribe to one or more channels in which they are interested. Once a user subscribes to a channel, the user can be presented with information from the channel's activity feed on the scrollable document. If a user subscribes to multiple channels, the activity feed for each channel to which the user is subscribed can be combined into a syndicated activity feed. Information from the syndicated activity feed can be presented to the user, such as via a different scrollable document. Although channels are described as one implementation of a content sharing platform, implementations of the disclosure are not limited to content sharing platforms that provide media items via a channel model.

Although implementations of the disclosure are discussed in terms of content sharing platforms and promoting social network sharing of a media item on the content sharing platform, implementations may also be generally applied to any type of social network that provides connections between users or to any type of content delivery platform providing content to end users. Implementations of the disclosure are not limited to content sharing platforms or to platforms that provide channel subscriptions to users.

In situations in which the systems discussed here collect personal information about users, or may make use of personal information, the users may be provided with an opportunity to control whether the content sharing platform 110 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 110.

Figure 2:
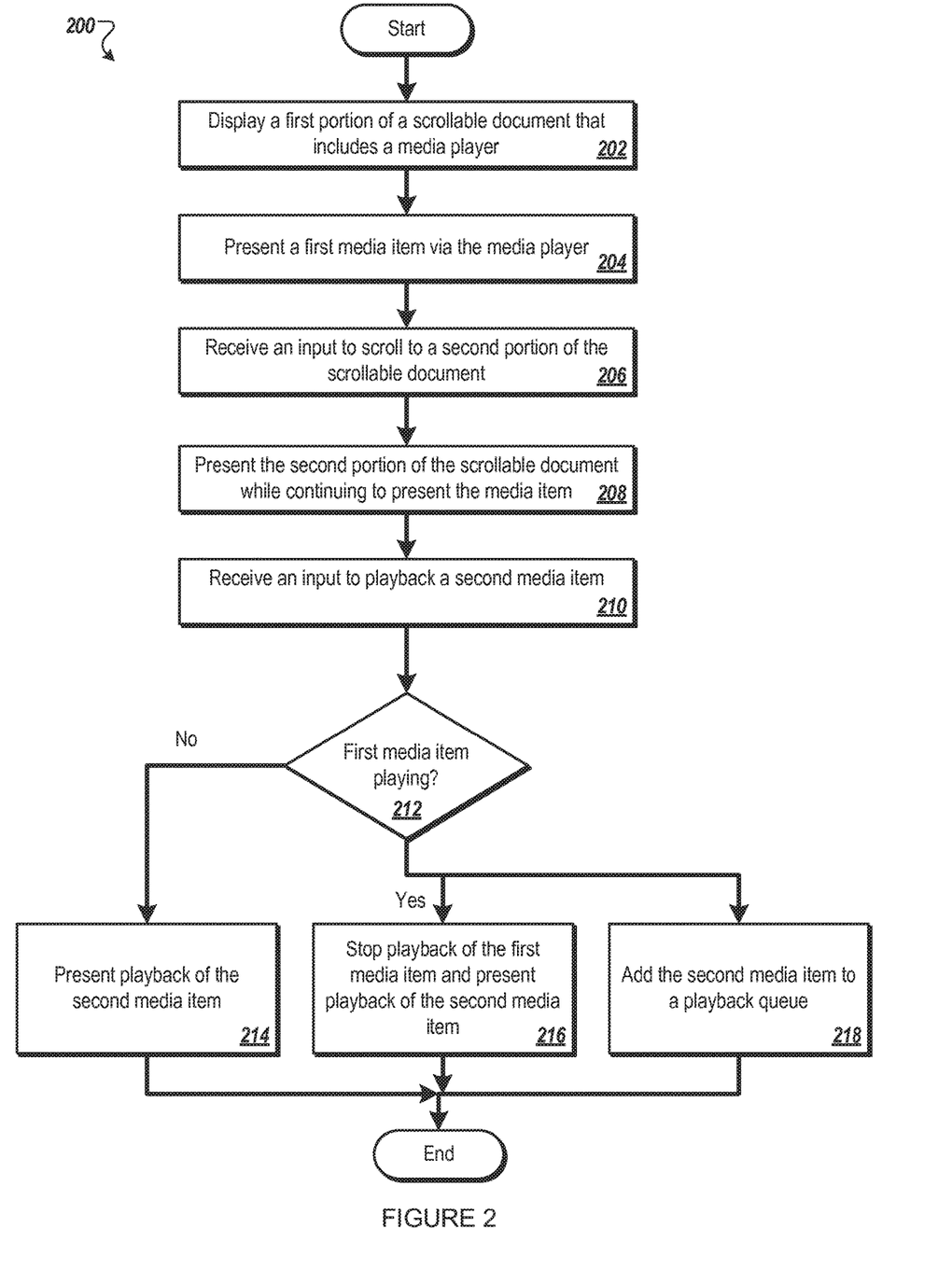
FIG. 2 is a flow diagram illustrating a method for providing a persistent media player by a client device, according to some implementations of the disclosure.

FIG. 2 is a flow diagram illustrating a method 200 for providing a persistent media player on a client device, according to some implementations of the disclosure. The method 200 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by client-side media item presentation component 118 as shown in FIG. 1.

Referring to FIG. 2, method 200 begins at block 202 when processing logic displays a first portion of a scrollable document in a user interface (UI) of an application. The application can be for media sharing, social networking, etc. The first portion of the scrollable document includes a media player for presenting a first media item, such as a video. At block 204, the processing logic presents the first media item via the media player. The first media item can autoplay when it is displayed in the UI. Alternatively, the first media item can be playing in response to user request (e.g., input via the UI) to play the first media item.

At block 206, the processing logic receives an input to scroll to a second portion of the scrollable document. The input can be associated with an input device, such as a mouse, keyboard, touchscreen, trackpad, etc. The input can be a click, a swipe, a gesture, a wheel rotation, etc. At block 208, the processing logic displays the second portion of the scrollable document. When the second portion of the scrollable document is displayed, the first portion is no longer visible but the persistent media player continues to be visible. If the persistent media player is playing a media item when the second portion of the scrollable document is displayed, the persistent media player can continue to play the media item without interruption. In implementations, when the persistent media player finishes playing the media item, the processing logic stops displaying the persistent media player.

In some implementations, the processing logic can receive a request (or input) to playback a second media item via the media player, such as while the persistent media player is visible. The processing logic can receive the request from any source, including via an autoplay command from any portion of the scrollable document. If the first media item is not being played at the time the request to playback the second media item is received (block 212), then the processing logic can present playback of the second media item at block 214. If the first media item is being played at the time of the request to play the second media item, then, in some implementations, the processing logic can stop playback of the first media item and start playback of the second media item. For example, when a user selects the second media item, the processing logic can stop playback of the first media item and can start playback of the second media item. In other implementations, when the first media item is being played at block 212, then the processing logic can add the second media item to a playback queue. For example, when the second media item is an advertisement that is set to autoplay upon being presented within a UI, the second media item can be added to the playback queue so as to not interrupt playback of the first media item.

Figures 3A, 3B:
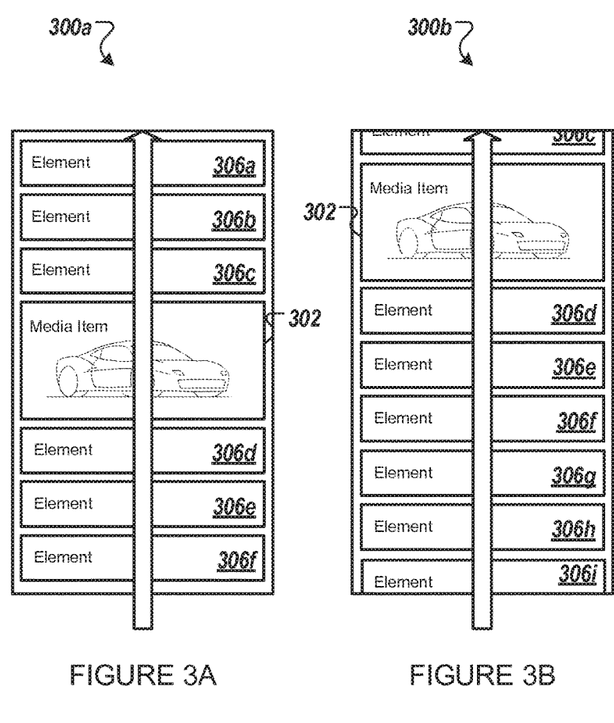
FIGS. 3A, 3B, and 3C are example screenshots illustrating User Interfaces (UIs) for providing a persistent media player, according to some implementations of the disclosure.
Figure 3C:
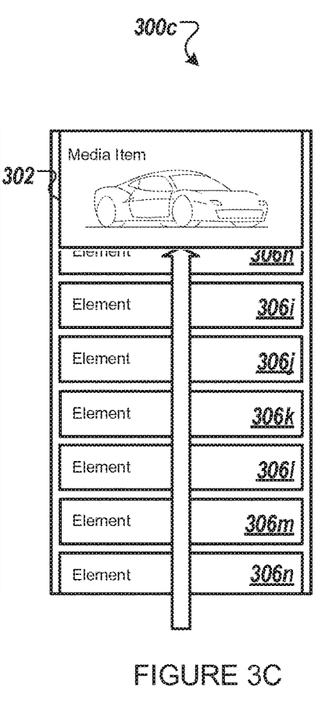
Figure 4:
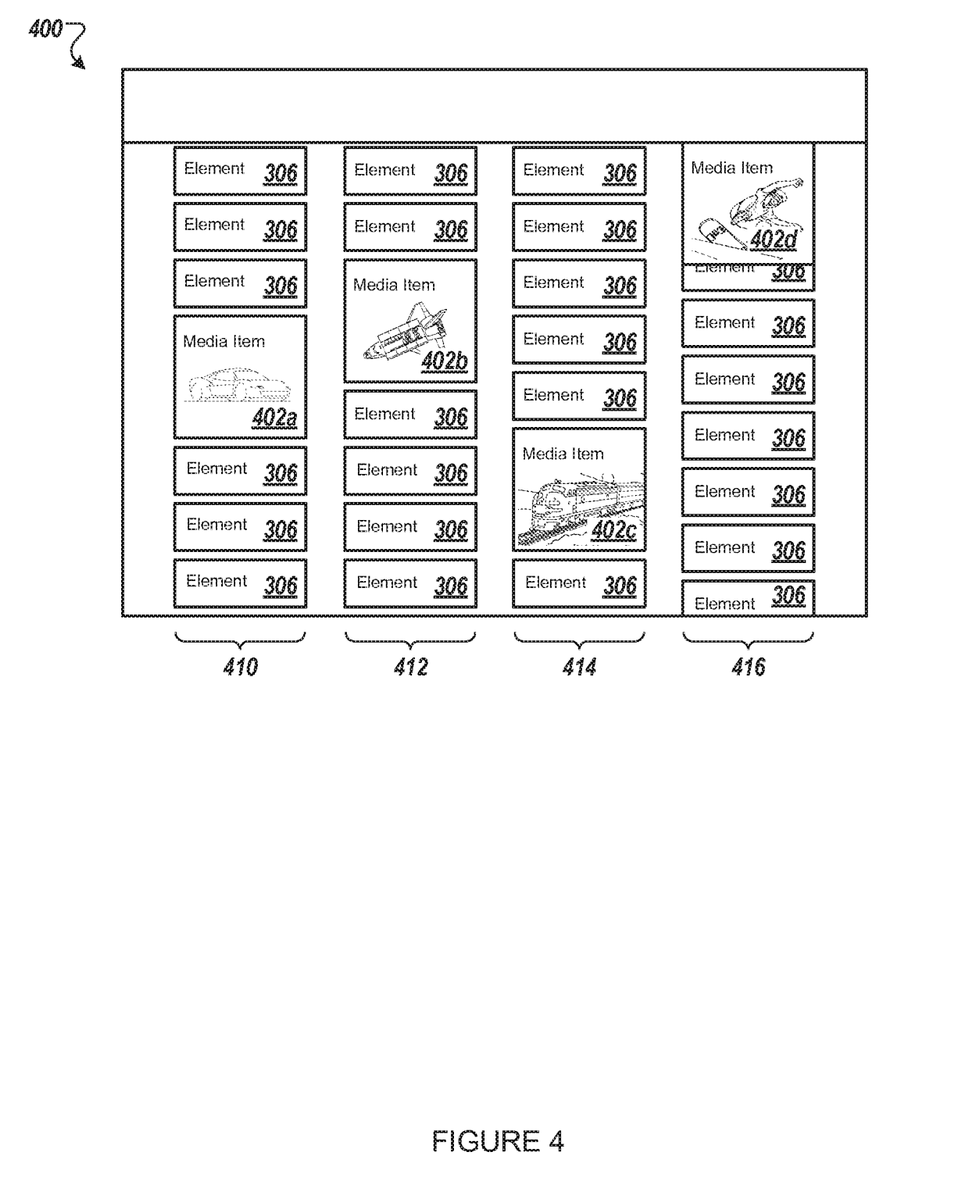
FIG. 4 is an example screenshot illustrating UIs for providing a persistent media player among multiple columnar elements, according to some implementations of the disclosure.
Figure 5A:
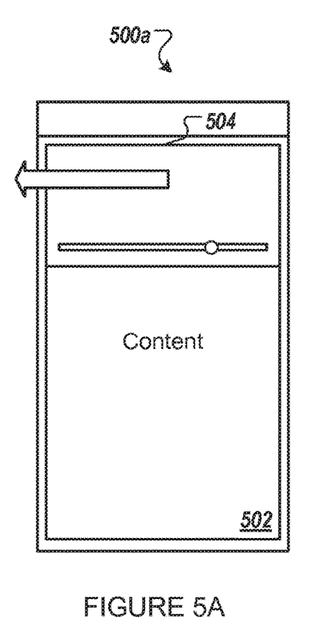
FIGS. 5A, 5B and 5C are example screenshots illustrating UIs for dismissing a persistent media player, according to some implementations of the disclosure.
Figure 5B:
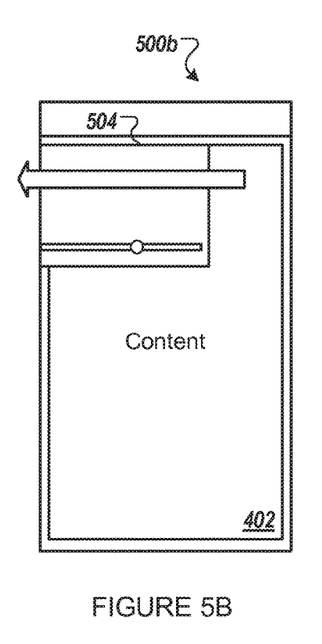
Figure 5C:
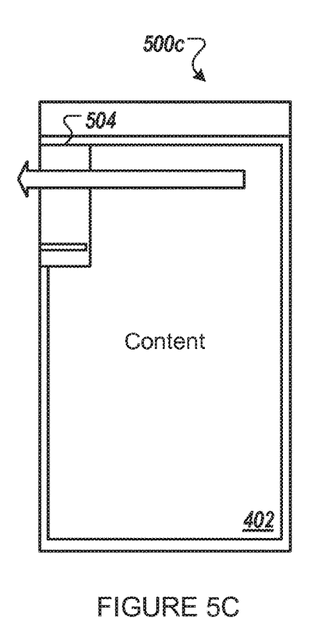

FIGS. 3-5 are example screenshots illustrating UIs for providing a persistent media player. FIG. 3A illustrates an example screenshot of a visible portion of a scrollable document 300a provided to a user via a UI of an electronic device. The scrollable document 300a includes a media item 302 of a content sharing platform and any number of content elements 306a-n. The media item 302 can be played in a media player that is provided by a content sharing platform, such as a media item presentation component 118, as described in conjunction with FIG. 1. The elements 306a-n can be any type or kind of document element, such as a post, feed item, blurb, social message, blog entry, news item, media item, aggregation item, or the like. For example, the elements 306a-n can include status updates shared by a user's social contacts within a social network. In implementations, an element can include one or more media items 302.

When a user scrolls the document 300a, the position of elements 306a-f changes with respect to the user's scroll input. For example, when the user scrolls the document upward, elements 306a-c at the top of the UI appear to move off of the visible portion of the UI and elements below the visible portion of the UI (e.g., elements 306g-n) can appear.

In the scrollable document 300b of FIG. 3B, the position of the elements 306 and media item 302 has changed with respect to their respective positions in FIG. 3A. Namely, elements 306a-c at the top of the UI are no longer visible, the media item 302 is now near the top of the UI and additional elements 306 g-i now appear at the bottom portion of the UI.

In the scrollable document 300c of FIG. 3C, the user has continued to scroll the document upward. Some elements that were positioned below the media item 302 (e.g., elements 306d-h) are now no longer visible on the UI, although the media item 302 persists. In some implementations, the media item 302 persists if it is playing when the user scrolls the document 300c, even if the scroll would conventionally move the media item off of the visible portion of the UI. The user may interact with any interfaces, functions, and menus as they would without the media item 302 being present on the screen and the playback of the media item 302 will not be interrupted.

In implementations, the space in the scrollable document which the media item element originally occupied can include a faded out animated duplicate of the media item, a blank space, or a thumbnail representing the media item. When the user scrolls such that this element is sufficiently within the viewing area the media item can return to being rendered in this embedded position of the scrollable document instead of a modified position of the persistent media player.

The modified position of the persistent media player can depend on which direction a user is scrolling relative to the in-document media item. If the user scrolls up so that the content is moving down the scrollable document and the media item element at the bottom leaves the visible document, then the persistent media player can appear at the bottom of the UI. Alternatively, if the top media item element leaves the UI, then the persistent media player would appear on the UI at the top. In implementations, when the scrollable document is scrolled in an opposite direction, which is downward according to the example described above, then the media item can remain stationary until the media item's original position in the scrollable documents is aligned with the media item 302, after which the media item 302 can move at the same rate of travel across the UI as the elements.

A user can activate (e.g., click, select, touch) the media item 302. Activation of the media item 302 can result in variety of different behaviors. In one implementation, clicking on the media item 302 pauses it and various gestures (e.g., swipe) will dismiss it or change to a next or previous media item in a playlist. In another implementation, clicking on the media item 302 might mute it or if the media item 302 is an ad it might redirect the user to a page for the advertised product. In some implementations, at the end of presentation of the media item, a call to action is presented to the user via the UI, such as an invitation to click a link or to be directed to a particular website or application.

In one implementation, the media item player persists above any operation, function, or application while the user is interacting with an electronic device. The user may browse and/or interact with interfaces, functions and menus related to any application or operating system of the electronic device. For example, the other interfaces, functions and menus may include a suggestions interface of what to watch next, a search interface for media items of the content sharing platform, a browsing interface for media items of the content sharing platform, a settings interface, a subscriptions interface, a playlists interface, a favorites interface, a history interface, an uploads interface, a different application, and so on. The user may interact with these interfaces, functions, and menus without interrupting playback of the media item.

Information corresponding to the media item currently playing back in the persistent media player, such as metadata, may be shown in a media item information portion of the scrollable document 300. For example, information about a video, such as its title, view count, likes, etc. can be presented via the scrollable document 300. Additional menu options (not shown) related to the media item currently playing back in the media item player may also be shown in scrollable document 300, such as play, pause, stop, fast forward, rewind, social post, add comment, etc. In some implementations when a user is viewing the scrollable document on a large screen, all or part of metadata can persist with the persistent media player. In implementations, the persistent media player can include an icon or a "tag" that a user can active to bring the corresponding post back on screen.

In implementations, the metadata can appear within the scrollable document, but when a user scrolls to another portion of the document and the persistent media player appears, the metadata can collapse to minimized form. In some instances, when a user activates a media item, the metadata can expand. The metadata can expand over other elements of the scrollable document. Alternatively, the other elements of the scrollable document can be moved to make room for presentation of the metadata. Metadata can disappear, or be item inside the persistent media player and can cover part of a playing media item. The persistent media player may include a minimization indicator (not shown). The user may minimize the persistent media player within the scrollable document 300 by selecting the minimization indicator.

The persistent media player may be implemented in any of a variety of sizes and is not limited to a specific position within a particular scrollable document or UI. The persistent media player may also be moved (e.g., dragged) within the UI to suit the user's preferences. In one implementation, the persistent media player may be "snapped" or "docked" to a position within the UI. For example, the persistent media player may be positioned relative to other elements of the UI within a media viewer and/or outside of a media viewer. In implementations, the persistent media player can be resized to different pre-determined sizes. In some implementations, the user may tap on the persistent media player to return the scrollable document to the position where the media item is located.

In another implementation, the persistent media player may be presented in a semi-transparent format while the user is performing other activities in the UI of a media viewer, such as media viewer 112 of FIG. 1. The user's interaction with the UI may be passed through to the media viewer below the semi-transparent player, and the user could, for example, browse while watching the persistent media player.

FIG. 4 illustrates an example screenshot of a visible portion of a scrollable document provided within UI 400 to a user that includes multiple columns 410-416 that each includes at least one element 306 and at least one media item 402. The UI 400 can include any number of columns. Each column can be scrolled independently in any direction. As illustrated, the columns are vertically scrollable and include columnar elements that are vertically arranged. Column 410 includes media item 402a, column 412 includes media item 402b, column 414 includes media item 402c, and column 416 includes media item 402d.

The media items 402a-d can be rendered within the UI 400 in different ways, such as being rendered as thumbnails, with a play button, etc. When one media item is playing, other media items within the UI can be rendered as small thumbnails. Once the media item finished playing and the user scrolls by another media item, then the other media item can be rendered as a large thumbnail. Further, as soon as a playing media item is dismissed, all other media items can be rendered from small to big at that time. Or, when media item is dismissed, other media item can stay the same and change rendering as they appear on the UI.

In implementations, clicking a media item (e.g., 402a, 402b, 402c) while another media item is playing (e.g., 402d) can add that media item to a queue. Alternatively, each media item 402 can have a separate button, that when clicked, adds the respective media item to the queue. Other implementations include autoplaying a second media item immediately. In further implementations, media items that are not playing can have two buttons—one to play the media item immediately and one to add the media item to the queue.

FIG. 5A illustrates an example screenshot of a content sharing platform application UI 500a with a persistent media player 504. To dismiss the persistent media player 504, the user may swipe left (as shown) or swipe right on the persistent media player 504. FIGS. 5B-5C illustrate the application UI 700 as the user is dismissing the persistent media player 504.

Although specific implementations of user gestures were described with respect to FIG. 5, other types of user gestures and directionality are envisioned in implementations of the disclosure and are not solely limited to those specifically illustrated in the example screenshots.

In implementations, the persistent media player may be minimized, maximized, and/or dismissed via gesture controls that are relative to the persistent media player portion of the media viewer UI. Regardless of a location of the persistent media player within the UI, gesture controls detected with respect to the persistent media player portion of the UI may operate to change a view of the persistent media player.

Figure 6:
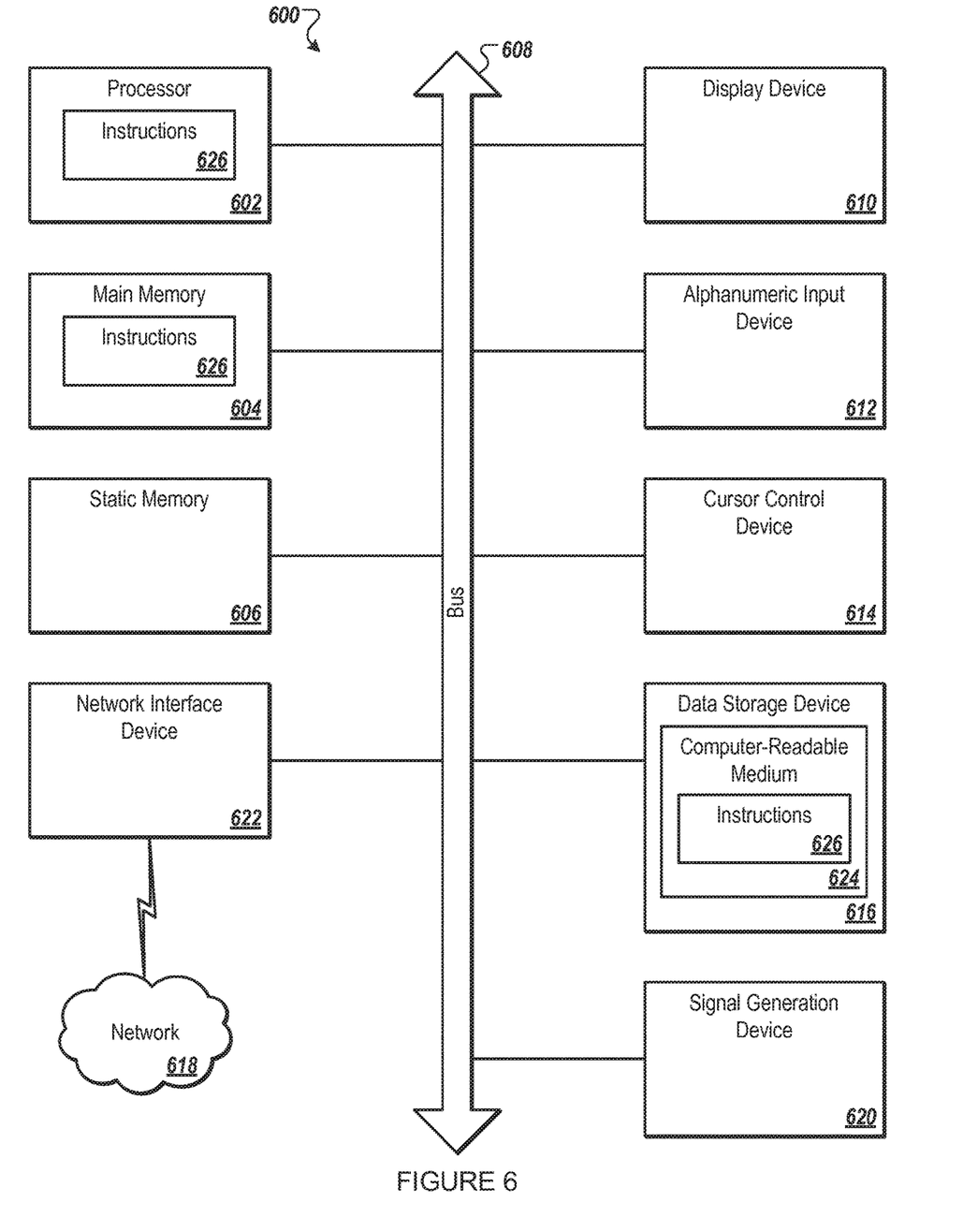
FIG. 6 is a block diagram illustrating an exemplary computer system, according to some implementations.

FIG. 6 illustrates a diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 618 via the network interface device 622.

In one implementation, the instructions 626 include instructions for a persistent media player, which may correspond, respectively, to client-side media item presentation component 118 and/or server-side media item presentation component described with respect to FIG. 1, and/or a software library containing methods that provide a persistent media player for a content sharing platform. While the computer-readable storage medium 624 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   displaying, by an electronic device, a first portion of a scrollable document in a user interface (UI) of an application executed on the electronic device, the UI comprising a media player in a first position, wherein the first portion of the scrollable document is visible to a user in the UI and includes a first media item of a plurality of media items and second media items of the plurality of media items, wherein the first media item is played by the media player in the UI;
   receiving a scroll input to scroll to a second portion of the scrollable document away from the first position, wherein the second portion follows the first portion in the scrollable document and includes third media items of the plurality of media items that are not visible to the user in the UI when the scroll input is received;
   scrolling the scrollable document in response to the scroll input, wherein the scrolling of the scrollable document in response to the scroll input is performed concurrently with playing the first media item by the media player, which continues to be visible in the UI in a second position, wherein continuing the scrolling of the scrollable document causes at least one of the third media items from the second portion of the scrollable document to be visible to the user in the UI; and
   in response to detecting a user swipe gesture to dismiss the media player that continues playing the first media item, causing the media player to be no longer visible in the UI.

2. The method of claim 1, wherein the scrollable document comprises at least one of a list of the plurality of media items, a social feed identifying the plurality of media items, an array of elements identifying the plurality of media items, or a set of columnar elements identifying the plurality of media items.

3. The method of claim 1, further comprising:
   in response to a user input to select a second media item from the second media items, ending playback of the first media item and starting playback of the second media item in the media player.

4. The method of claim 1, wherein the media player is to play the first media item for a period of time.

5. The method of claim 4, further comprising presenting a call-to-action after the period of time.

6. The method of claim 1, further comprising:
   allowing the user to perform an action with respect to the first media item being played by the media player in the second position.

7. The method of claim 6, wherein the action is any one of pausing playback of the first media item, stopping playback of the first media item, closing the media player, sharing the first media item, or liking the first media item.

8. The method of claim 1, wherein a size of the media player at the second position is smaller than a size of the media player at the first position.

9. The method of claim 1, wherein the second position is proximate to the bottom of a screen of the electronic device.

10. The method of claim 1, wherein the media player at the second position is presented in a semi-transparent format.

11. The method of claim 1, wherein the user swipe gesture is one of a swipe left gesture or swipe right gesture.

12. The method of claim 1, further comprising:
   in response to a request to play a second media item from the second media items that is associated with an autoplay option, ending playback of the first media item and starting playback of the second media item in the media player.

13. An electronic device comprising:
   a memory; and
   a processing device, coupled to the memory, to:
   display a first portion of a scrollable document in a user interface (UD) of an application executed on the electronic device, the UI comprising a media player in a first position, wherein the first portion of the scrollable document is visible to a user in the UI and includes a first media item of a plurality of media items and second media items of the plurality of media items, wherein the first media item is played by the media player in the UI;
   receive a scroll input to scroll to a second portion of the scrollable document away from the first position, wherein the second portion follows the first portion in the scrollable document and includes third media items of the plurality of media items that are not visible to the user in the UI when the scroll input is received;
   scroll the scrollable document in response to the scroll input, wherein the scrolling of the scrollable document in response to the scroll input is performed concurrently with playing the first media item by the media player, which continues to be visible in the UI in a second position, wherein continuing the scrolling of the scrollable document causes at least one of the third media items from the second portion of the scrollable document to be visible to the user in the UI; and
   in response to detecting a user swipe gesture to dismiss the media player that continues playing the first media item, cause the media player to be no longer visible in the UI.

14. The device of claim 13, wherein the scrollable document comprises at least one of a list of the plurality of media items, a social feed identifying the plurality of media items, an array of elements identifying the plurality of media items, or a set of columnar elements identifying the plurality of media items.

15. The device of claim 13, wherein the media player is to play the first media item for a period of time.

16. The device of claim 13, wherein the processing device is further to:
in response to the media player finishing to play the first media item and before detecting the user gesture to dismiss the media player, stop presentation of the media player at the second position in the UI.

17. The device of claim 13, wherein the user swipe gesture is one of a swipe left gesture or swipe right gesture.

18. The device of claim 13, wherein the processing device is further to:
in response to a request to play a second media item from the second media items that is associated with an autoplay option, end playback of the first media item and start playback of the second media item in the media player.

19. A non-transitory machine-readable storage medium storing instructions which, when executed, cause a processing device of an electronic device to perform operations comprising:
displaying a first portion of a scrollable document in a user interface (UD of an application executed on the electronic device, the UI comprising a media player in a first position, wherein the first portion of the scrollable document is visible to a user in the UI and includes a first media item of a plurality of media items and second media items of the plurality of media items, wherein the first media item is played by the media player in the UI;
receiving a scroll input to scroll to a second portion of the scrollable document away from the first position, wherein the second portion follows the first portion in the scrollable document and includes third media items of the plurality of media items that are not visible to the user in the UI when the scroll input is received;
scrolling the scrollable document in response to the scroll input, wherein the scrolling of the scrollable document in response to the scroll input is performed concurrently with playing the first media item by the media player, which continues to be visible in the UI in a second position, wherein continuing the scrolling of the scrollable document to present causes at least one of the third media items from the second portion of the scrollable document to be visible to the user in the UI, and
in response to detecting a user swipe gesture to dismiss the media player that continues playing the first media item, causing the media player to be no longer visible in the UI.

20. The non-transitory machine-readable storage medium of claim 19, wherein the user swipe gesture is one of a swipe left gesture or swipe right gesture.

* * * * *